US009274209B2

(12) United States Patent
Lobo et al.

(10) Patent No.: US 9,274,209 B2
(45) Date of Patent: Mar. 1, 2016

(54) POSITIONING

(75) Inventors: Natividade Albert Lobo, Windsor (GB);
Fabio Belloni, Espoo (FI)

(73) Assignee: Nokia Technologies Oy, Espoo (FI)

(*) Notice: Subject to any disclaimer, the term of this patent is extended or adjusted under 35 U.S.C. 154(b) by 686 days.

(21) Appl. No.: 13/517,116

(22) PCT Filed: Dec. 21, 2009

(86) PCT No.: PCT/EP2009/067710
§ 371 (c)(1),
(2), (4) Date: Jul. 9, 2012

(87) PCT Pub. No.: WO2011/076255
PCT Pub. Date: Jun. 30, 2011

(65) Prior Publication Data
US 2012/0274516 A1 Nov. 1, 2012

(51) Int. Cl.
*G01S 3/02* (2006.01)
*G01S 5/04* (2006.01)
(52) U.S. Cl.
CPC .......................................... *G01S 5/04* (2013.01)
(58) Field of Classification Search
CPC ................................................... G01S 5/04
USPC ........................................................ 342/451
See application file for complete search history.

(56) References Cited

U.S. PATENT DOCUMENTS

| 3,943,514 | A | 3/1976 | Afendykiw et al. |
| 4,592,034 | A | 5/1986 | Sachse et al. |
| 7,228,227 | B2 * | 6/2007 | Speer ............................ 701/467 |
| 7,272,404 | B2 * | 9/2007 | Overy et al. ............... 455/456.1 |
| 8,264,408 | B2 | 9/2012 | Kainulainen et al. |
| 2008/0100505 | A1 * | 5/2008 | Malinovskiy et al. ... 342/357.06 |

OTHER PUBLICATIONS

Mao et al., "Wireless Sensor Network Localization Techniques", Computer Networks, vol. 51, Issue 10, Jul. 2007, pp. 2529-2553.
Rappaport et al., "Position Location Using Wireless Communications on Highways of the Future", IEEE Communications Magazine, vol. 34, Issue 10, Oct. 1996, pp. 33-41.
International Search Report and Written Opinion received for corresponding International Patent Application No. PCT/EP2009/067710, dated Sep. 30, 2010, 11 pages.

* cited by examiner

Primary Examiner — Frank J McGue
(74) Attorney, Agent, or Firm — Locke Lord LLP

(57) ABSTRACT

A positioning method comprising: solving a geometric algebraic expression that relates: position vectors for a plurality of antennas relative to a shared origin, a putative position vector for the shared origin and phase information measured at each of the plurality of antennas, to determine a position vector for the shared origin; and positioning an apparatus using the determined position vector for the shared origin.

19 Claims, 3 Drawing Sheets

POSITIONING

RELATED APPLICATION

This application was originally filed as PCT Application No. PCT/EP2009/067710 filed Dec. 21, 2009.

FIELD OF THE INVENTION

Embodiments of the present invention relate to positioning. In particular, they relate to the use of geometric algebraic solutions.

BACKGROUND TO THE INVENTION

When there is antenna diversity and each antenna is controlled to receive the same signal from a distant source, the relative phase differences between the received signals may be processed to determine the direction from which signal was transmitted.

BRIEF DESCRIPTION OF VARIOUS EMBODIMENTS OF THE INVENTION

According to various, but not necessarily all, embodiments of the invention there is provided a positioning method comprising: solving a geometric algebraic expression that relates: position vectors for a plurality of receivers relative to a shared origin, a putative position vector for the shared origin and phase information of waves measured at each of the plurality of receivers, to determine a position vector between the shared origin and a source of the waves; and positioning an apparatus using the determined position vector.

According to various, but not necessarily all, embodiments of the invention there is provided an apparatus comprising: processing circuitry configured to solve a geometric algebraic expression that relates: position vectors for a plurality of receivers relative to a shared origin, a putative position vector for the shared origin and received wave phase information for each of the plurality of receivers, to determine a position vector for the shared origin and configured to relatively positioning a source of the received waves and the shared origin.

According to various, but not necessarily all, embodiments of the invention there is provided a positioning method comprising: solving a geometric algebraic expression that relates: position vectors for a plurality of antennas relative to a shared origin, a putative position vector for the shared origin and phase information measured at each of the plurality of antennas, to determine a position vector for the shared origin; and positioning an apparatus using the determined position vector for the shared origin.

According to various, but not necessarily all, embodiments of the invention there is provided an apparatus comprising: processing circuitry configured to solve a geometric algebraic expression that relates: position vectors for a plurality of antennas relative to a shared origin, a putative position vector for the shared origin and phase information for each of the plurality of antennas, to determine a position vector for the shared origin and configured to positioning the apparatus using the determined position vector for the shared origin; and an interface configured to provide phase measurements.

It is expected that the positioning method will be robust to the presence of noise.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

The following description presents a new methodology that is applicable for positioning. The new methodology relies upon minimizing a cost function expressed using geometric algebra (see Equation 1 below).

The cost function is dependent upon position vectors for a plurality of antennas relative to a shared origin, a position vector for the shared origin and real phase information for each of the plurality of antennas. The position vector of an antenna and the position vector for the shared origin define theoretical phase information for the antenna in the cost function.

The cost function expresses summation, over all antennas and all measurements, of the square of a difference value.

The difference value is the difference between real (e.g. measured) phase information for an antenna and expected (e.g. calculated) phase information for the antenna.

When performing positioning, the expected phase information for an antenna is dependent upon a putative position of a shared origin used to position the antennas and the position of the antenna from that origin.

The minimum of the cost function finds the position of the shared origin that reduces the difference, on the average across the antennas, between the real phase information and the theoretically determined phase information.

The minimum of the cost function is found using geometric, as opposed to linear, algebra.

Geometric algebra and the associated calculus provides one with a method of setting up equations using both known and unknown vectors and then solving the equations for the unknown vectors in terms of the known vectors. A similar process can be achieved using linear algebra, but in this case one does have to select a coordinate system and then operate with the components of the vectors using matrices. However, the complete vector space needs to be specified, when matrices are used, while when one uses the geometric algebraic approach, only the sub space spanned by the vectors need to be specified. This enables the geometric algebraic solutions to be more generic. With matrices, one needs to be careful finding inverses. In geometric algebra, we do not get this problem.

Figure 1:
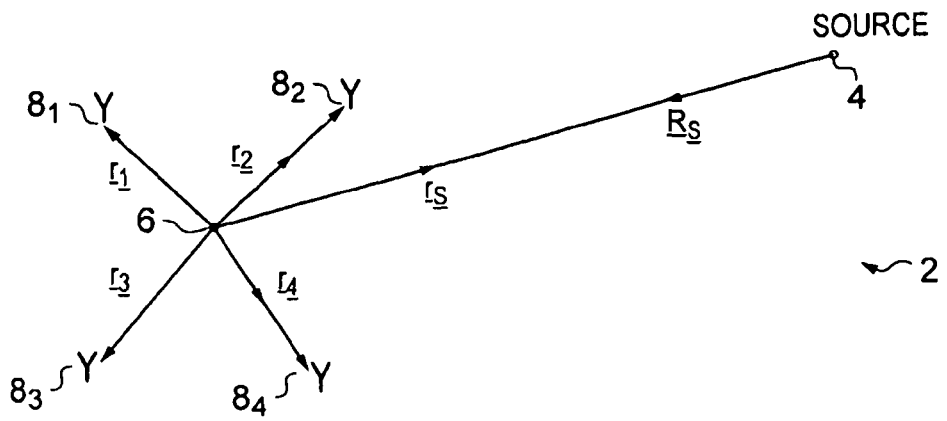
FIG. 1 schematically illustrates an arrangement of a plurality of antennas that receive radio signals broadcast by the source.

FIG. 1 schematically illustrates an arrangement of a plurality of antennas 8 that receive radio signals broadcast by the source 4.

Each antenna $8_n$ is positioned at a displacement $r_n$ from a common or shared origin 6. This displacement is defined as the position vector $r_n$ for the antenna n. It should be understood that the position of an antenna $8_n$ for the purpose of receiving radio waves may be different to the physical position of the antenna $8_n$.

The source of the radio signals is positioned at a displacement $r_s$ from the shared origin 6.

The shared origin 6 is positioned at a displacement $R_s$ from the source 4 of the radio signals. This displacement is defined as the position vector $R_s$ for the shared origin.

In the following description the terms vector and displacement may be used interchangeably. A vector may be represented using either bold font $r_n$ or over-scoring $\vec{r}_n$ depending on context.

The cost function may be expressed as:

$$\sum_{n=1}^{\Gamma}\sum_{k=1}^{P(n)}\left(\vec{r}_n \cdot \hat{R}_s - \beta_{n,k}\right)^2 \quad (1)$$

where the outer summation limit $\Gamma$ is the number of antenna n, the inner summation limit $P(n)$ is the number of phase measurements made at the antenna n, and $\beta_{n,k}$ is phase information relating to a phase measurement at instant k at antenna n and is expressed in the dimensions of distance $$\beta_{n,k} = \frac{2c}{\omega}(\alpha_{n,k} - \theta_n) \quad (2)$$

where $\alpha_{n,k}$ is the phase measurement at instant k at antenna n, $\theta_n$ is a predetermined antenna dependent phase offset, c is the speed of light and $\omega$ is the frequency of the transmitted radio signal.

Figure 2:
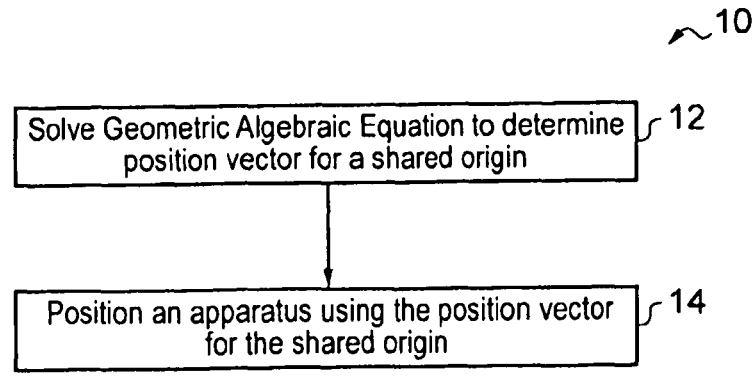
FIG. 2 schematically illustrates a method for determining the position vector for the shared origin.

FIG. 2 schematically illustrates a method 10 for determining the position vector $R_s$ for the shared origin.

At block 12 a geometric algebraic expression is solved to determine the position vector $R_s$ for the shared origin. The geometric algebraic expression that is solved is:

$$\partial_R \sum_{n=1}^{\Gamma}\sum_{k=1}^{P(n)}\left(\vec{r}_n \cdot \hat{R}_s - \beta_{n,k}\right)^2 = 0 \quad (3)$$

The geometric algebraic expression relates: position vectors $r_n$ for a plurality of antennas 8 relative to a shared origin 6, a putative position vector $R_s$ for the shared origin and scalar phase information $\beta_{n,k}$ measured at each of the plurality of antennas.

The difference value is the difference between real measured phase information $\beta_{n,k}$ for an antenna and theoretical phase information for the antenna. The dot product of the position vector $r_n$ of an antenna and the position vector $R_s$ for the shared origin 6 define theoretical phase information, expressed in the dimensions of distance, for the antenna n. The solution to Equation (3) finds the position of a shared origin $R_s$ that reduces the difference, on the average across the antennas, between the real phase information and the theoretically determined phase information.

By defining the mean-squared phase dependent vector $$\vec{\gamma} = \sum_{n=1}^{\Gamma}\sum_{k=1}^{P(n)}\left(\frac{1}{2}\beta_{n,k}\vec{r}_n\right)^2 \quad (4)$$

& the mean origin dependent vector $$\partial[\hat{\vec{R}}_{s,m}] = \sum_{n=1}^{\Gamma}\sum_{k=1}^{P(n)}\left(\frac{1}{4}\vec{r}_n\hat{\vec{R}}_{s,m}\vec{r}_n\right) \quad (5)$$

It is possible to re-express equation (3) as $$(\partial[\hat{R}^*_{s,m}] - \vec{\gamma}) \wedge \hat{R}^*_{s,m} = 0 \quad (6)$$

Solving the geometric algebraic expression given by Equation (6) comprises determining a putative position vector $R_s$ for the shared origin 6 that is parallel to a difference vector defined as the difference between the mean origin dependent vector and the mean-squared phase dependent vector.

Equation 6 may be re-expressed as $$\partial[\hat{R}^*_{s,m}]\hat{R}^*_{s,m} - \hat{R}^*_{s,m}\partial[\hat{R}^*_{s,m}] - \vec{\gamma}\partial[\hat{R}^*_{s,m}] + \hat{R}^*_{s,m}\vec{\gamma} = 0 \quad (7)$$

This equation may be solved iteratively as discussed in detail below.

Next at block 14, an apparatus is positioned using the determined position vector $R_s$ for the shared origin.

Figure 4:
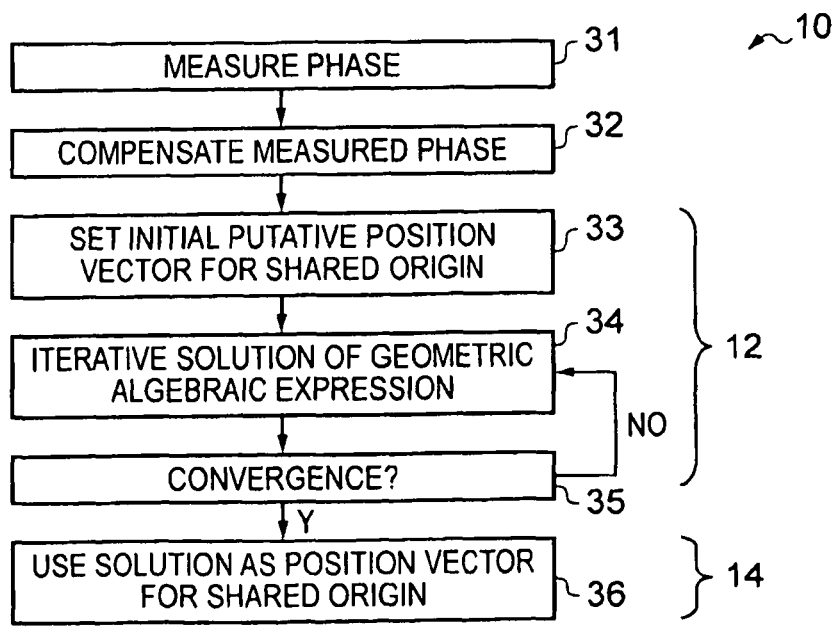
FIG. 4 schematically illustrates an example of a method for determining the position vector of the shared origin.

FIG. 4 schematically illustrates an example of the method 10 in more detail.

At block 31, a phase $\alpha_{n,k}$ of a received signal transmitted by the source 4 is measured, at each antenna n at each instance k.

At block 32 the measured phase $\alpha_{n,k}$ of a received signal is compensated by subtracting an antenna dependent phase offset $\theta_n$ to create phase information. The phase information may be expressed in the dimensions of distance by multiplication by the scalar $$\frac{2c}{\omega}$$

(see Equation (2)).

Equation (7) may be used to create a number of distinct update multivector expressions for iterative processing.

Expressing the fourth term of Equation (7) as an iterative term provides:

$$\hat{\vec{R}}_{s,m+1} = \left(-\partial[\hat{\vec{R}}_{s,m}]\hat{\vec{R}}_{s,m} + \hat{\vec{R}}_{s,m}\partial[\hat{\vec{R}}_{s,m}] + \vec{\gamma}\partial[\hat{\vec{R}}_{s,m}]\right)\vec{\gamma}^{-1} \quad (8A)$$

Expressing the third term of Equation (7) as an iterative term provides:

$$\hat{R}^*_{s,m+1} = \vec{\gamma}^{-1}(\partial[\hat{R}^*_{s,m}]\hat{R}^*_{s,m} - \hat{R}^*_{s,m}\partial[\hat{R}^*_{s,m}] + \hat{R}^*_{s,m}\vec{\gamma}) \quad (8B)$$

Expressing the second term of Equation (7) as an iterative term provides:

$$\hat{R}^*_{s,m+1} = (\partial[\hat{R}^*_{s,m}]\hat{R}^*_{s,m} - \vec{\gamma}\partial[\hat{R}^*_{s,m}] + \hat{R}^*_{s,m}\vec{\gamma})\partial[\hat{R}^*_{s,m}]^{-1} \quad (8C)$$

Expressing the first term of Equation (7) as an iterative term provides:

$$\hat{\vec{R}}_{s,m+1} = \partial[\hat{\vec{R}}_{s,m}]^{-1}\left(\hat{\vec{R}}_{s,m}\partial[\hat{\vec{R}}_{s,m}] + \vec{\gamma}\partial[\hat{\vec{R}}_{s,m}] - \hat{\vec{R}}_{s,m}\vec{\gamma}\right) \quad (8D)$$

Thus the iterative solution may be defined as $$\hat{\vec{R}}_{s,m+1} = f(\partial[\hat{\vec{R}}_{s,m}], \vec{\gamma}, \hat{\vec{R}}_{s,m}) \quad (9)$$

where $f$ is a multivector function which may be any one of Equations 8A, 8B, 8C or 8D or any weighted summation of Equations 8A, 8B, 8C or 8D.

Next at block 33, the initial putative position vector $R_{s,1}$ for the shared origin is set. The value of the mean-squared phase dependent vector $\vec{\gamma}$ is determined and stored for use as a constant vector during the iteration Next at block 34, the mean origin dependent vector $[\partial[\vec{R}^2_{s,1}]]$ is determined and the next putative iterative solution is defined as $$\hat{\vec{R}}_{s,2} = f(\partial[\hat{\vec{R}}_{s,1}], \vec{\gamma}, \hat{\vec{R}}_{s,1}) \quad (10)$$

Next at block 35, the putative iterative solution is tested for convergence. One example of a suitable convergence criterion is $$0 \leq |\hat{\vec{R}}_{s,m+1} - \hat{\vec{R}}_{s,m}| < \epsilon \quad (11)$$

If convergence is achieved, the method moves to block 36.
If convergence is not achieved, the method returns to block 34 where a new iterative solution is determined according to:

$$\hat{\vec{R}}_{s,m+1} = f(\partial[\hat{\vec{R}}_{s,m}], \vec{\gamma}, \hat{\vec{R}}_{s,m}) \quad (10)$$

At block 36, after convergence has been achieved, the putative iterative solution is used as the position vector $R_s$ for the shared origin. The value of the initial putative position vector $R_{s,1}$ may be updated to the value of $R_s$.

Figure 3:
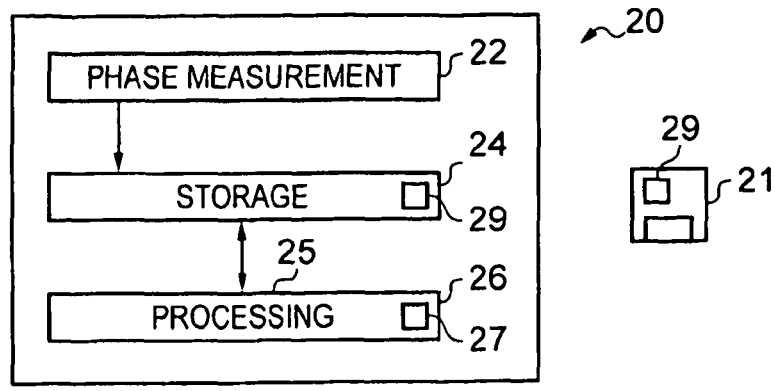
FIG. 3 schematically illustrates an example of an apparatus suitable for performing positioning.

FIG. 3 schematically illustrates an example of an apparatus 20 suitable for performing positioning as described in the preceding paragraphs.

The apparatus 20 comprises: phase measurement circuitry 22; storage circuitry 24; and processing apparatus 26.

The phase measurement circuitry 22 is configured to measure, for at least one and in some embodiments all of the antennas, the phase of a received signal at each antenna.

The storage circuitry 24 is configured to store data for use by the processing apparatus 26. The data includes a look-up table comprising the set $\{\theta_n\}$ of predetermined antenna dependent phase offsets, the set of position vectors $\{r_n\}$ relative to a shared origin 6 for the plurality of antennas 8 and the initial putative position vector $R_{s,1}$.

The offsets are valid while the set of position vectors $\{r_n\}$ remains unchanged. If it changes, the set $\{\theta_n\}$ of predetermined antenna dependent phase offsets and the set of position vectors $\{r_n\}$ need to be recalculated.

The processing apparatus 26 comprises: an interface 25 and processing circuitry 27. The interface 25 is configured to provide the set of phase measurements $\{\alpha_{n,k}\}$ from the phase measurement circuitry 22 (and/or the storage 24) to the processing circuitry 27. The interface 25 is also configured to provide the set $\{\theta_n\}$ of predetermined antenna dependent phase offsets, the set of position vectors $\{r_n\}$ and the initial putative position vector $R_{s,1}$ from the storage circuitry 24 to the processing circuitry 27.

The processing circuitry 27 configured to solve the geometric algebraic expression and determine the position vector $R_s$ for the shared origin. The processor is configured to perform block 12 and block 14 of FIGS. 2 and 4.

Implementation of the processing circuitry 27 can be in hardware alone (a circuit, a processor . . . ), have certain aspects in software including firmware alone or can be a combination of hardware and software (including firmware).

The processing circuitry 27 may be implemented using instructions that enable hardware functionality, for example, by using executable computer program instructions in a general-purpose or special-purpose processor that may be stored on a computer readable storage medium (disk, memory etc) to be executed by such a processor.

The processing circuitry 27 is configured to read from and write to the storage 24.

The storage 24 may be a memory that stores a computer program 29 comprising computer program instructions that control the operation of the apparatus when loaded into the processing circuitry 27. The computer program instructions provide the logic and routines that enables the apparatus to perform the methods illustrated in FIGS. 2 and 4. The processing circuitry 27 by reading the memory 24 is able to load and execute the computer program 29.

The computer program may arrive at the apparatus 20 via any suitable delivery mechanism 21. The delivery mechanism 21 may be, for example, a computer-readable storage 24 medium, a computer program product, a memory device, a record medium, an article of manufacture that tangibly embodies the computer program 29. The delivery mechanism may be a signal configured to reliably transfer the computer program 29.

Although the storage 24 is illustrated as a single component it may be implemented as one or more separate components some or all of which may be integrated/removable and/or may provide permanent/semi-permanent/dynamic/cached storage 24.

References to 'computer-readable storage 24 medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The processing apparatus 26 may be a module. As used here 'module' refers to a unit or apparatus that excludes certain parts/components that would be added by an end manufacturer or a user.

The set $\{\theta_n\}$ of predetermined antenna dependent phase offsets may be determined by measuring the antenna response in a anechoic chamber or by using the specification given by the antenna manufacturer. The antenna dependent phase offset gives a measure of the impact of the antenna characteristic on the phase of a signal recorded by the antenna itself.

The set of position vectors $\{r_n\}$ may be determined by solving the equation $$\partial_{r_n} \sum_{n=1}^{\Gamma} \sum_{q=1}^{\Delta} \sum_{k=1}^{P(n)} \left( \vec{r}_n \cdot \hat{\vec{r}}_{s,q} - \beta_{n,k,q} \right)^2 = 0 \quad (12)$$

when $r_{s,q}$ is a known current position of the shared origin, and there are a set $\{r_{s,q}\}$ of known positions of the shared origin at different instances.
where.

$$\beta_{n,k,q} = \frac{2c}{\omega}(\alpha_{n,k,q} - \theta_{n,q}) \quad (13)$$

and $\alpha_{n,k,q}$ is the phase measurement at instant k at antenna n, $\theta_{n,q}$ is a predetermined antenna dependent phase offset when the shared origin is $r_{s,q}$, c is the speed of light and w is the frequency of the transmitted radio signal.

This can be solved iteratively using $$r_{n,m+1} = \frac{\left( \sum_{q=1}^{\Delta} \sum_{k=1}^{P[n]} \left( 2\hat{\vec{r}}_{s,q} \beta_{q,n,k} - \hat{\vec{r}}_{s,q} \vec{r}_{n,m} \hat{\vec{r}}_{s,q} \right) \right)}{P[n]\Delta} \quad (14)$$

using the initial putative solution $$r_{n,1} = \frac{\left( \sum_{q=1}^{\Delta} \sum_{k=1}^{P[n]} \left( 2\hat{\vec{r}}_{s,q} \beta_{q,n,k} - \hat{\vec{r}}_{s,q} \vec{\rho}_n \hat{\vec{r}}_{s,q} \right) \right)}{P[n]\Delta} \quad (15)$$

where m is the index of the iteration and $\rho_n$ is the physical geometric position vector of the nth antenna with respect to the shared origin.

The iteration continues until convergence as defined by:

$$0 \leq |\vec{r}_{n,m+1} - \vec{r}_{n,m}| < \epsilon \quad (16)$$

where $\epsilon$ is a positive (>0) accuracy parameter.

The solution at convergences is the position vector $r_n$ of the antenna $8_n$. The iteration is repeated for each value of n to produce the set $\{r_n\}$ which is stored in storage 24.

The set $\{r_n\}$ of antenna location may alternatively be estimated by measuring the response of the antennas and by exploiting EADF (effective aperture distribution function).

Figure 5:
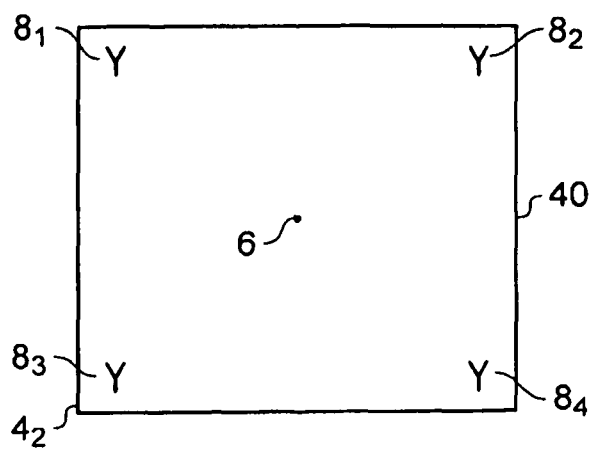
FIG. 5 schematically illustrates an apparatus comprising the plurality of antennas.

FIG. 5 schematically illustrates an apparatus 40 comprising a housing 42. The housing 42 houses the plurality of antennas $8_n$ where n=1, 2 . . . $\Gamma$. In this example, the shared origin is defined within the housing 42, for example, at the centre of the apparatus 40. The position vector $R_s$ for the shared origin in this example is also the position of the apparatus 40 from the radio source 4.

Figure 6:
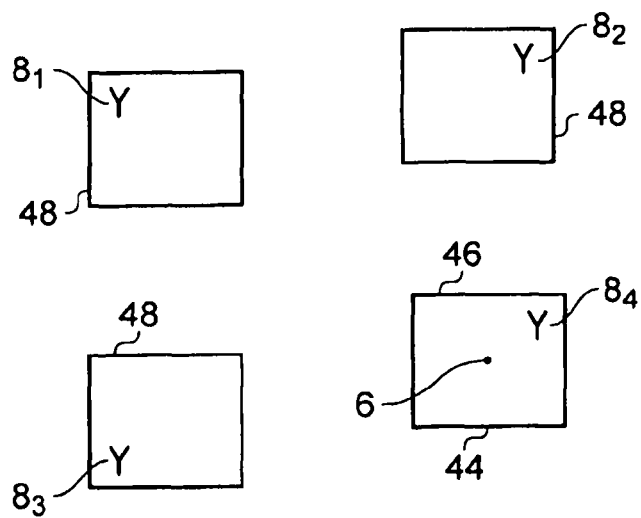
FIG. 6 schematically illustrates an apparatus comprising a subset of the plurality of antennas.

FIG. 6 schematically illustrates an apparatus 44 comprising a housing 46. The housing 42 houses a subset of the plurality of antennas $8_n$ where n=1, 2 . . . $\Gamma$.

In this example, housing houses antenna the $8_4$. The shared origin 6 is defined within the housing 46, for example, at the centre of the apparatus 44. The position vector $R_s$ for the shared origin in this example is also the position of the apparatus 44 from the radio source 4. The apparatus 44 may communicate to other apparatus 48, the relative position vector of that apparatus from the apparatus 44 and the position vector $R_s$ of the apparatus 44. For example, the apparatus may send to an apparatus 48 housing the antenna $8_1$ the position vectors R, and $r_1$.

The positioning algorithm may be adapted to make it more effective for tracking a position. The arguments of the function f defining the iterative solution may be weighted towards the most recently used arguments. For example, the mean-squared phase dependent vector $\gamma$ may be defined as $$\gamma = \lambda \gamma_{old} + (1 - \lambda) \gamma_{new} \quad (17)$$

i.e.

$$\vec{\gamma} = \lambda \left( \sum_{n=1}^{\Gamma} \sum_{k_{old}=1}^{P_{old}(n)} \left( \frac{1}{2} \beta_{n,k} \vec{r}_n \right)^2 \right) + (1 - \lambda) \left( \sum_{n=1}^{\Gamma} \sum_{k_{new}=1}^{P_{new}(n)} \left( \frac{1}{2} \beta_{n,k} \vec{r}_n \right)^2 \right) \quad (18)$$

For example, the mean origin dependent vector be defined as $$\partial[\hat{\vec{R}}_{s,m}] = \lambda \left( \sum_{n=1}^{\Gamma} \sum_{k_{old}=1}^{P_{old}(n)} \left( \frac{1}{4} \vec{r}_n \hat{\vec{R}}_{s,m} \vec{r}_n \right) \right) + (1 - \lambda) \left( \sum_{n=1}^{\Gamma} \sum_{k_{new}=1}^{P_{new}(n)} \left( \frac{1}{4} \vec{r}_n \hat{\vec{R}}_{s,m} \vec{r}_n \right) \right)$$

where $0 < \lambda < 1$.

The blocks illustrated in the FIGS. 2 and 4 may represent steps in a method and/or sections of code in the computer program 29. The illustration of a particular order to the blocks does not necessarily imply that there is a required or preferred order for the blocks and the order and arrangement of the block may be varied. Furthermore, it may be possible for some steps to be omitted.

In the preceding paragraphs, the position vector $R_s$ defines the position of the shared origin 6 from the radio source 4. If the position of the radio source 4 is known then the position of the shared origin is determined by the position vector $R_s$. If the position of the shared origin is known then the position of the radio source 4 is determined by the position vector $R_s$. The method may therefore position either the shared origin 6 or position the radio source 4 depending upon applications.

The preceding paragraphs have concentrated on positioning using radio waves from a radio source 4. However, the method as described is applicable to audio waves as opposed to radio waves. In the radio implementation, the antennas 8 are replaced by appropriate receivers such as pressure sensing microphones and the radio source 8 is replaced by an appropriate wave source such as an audio source.

The method can therefore be generalized to a positioning method comprising: solving a geometric algebraic expression that relates: position vectors for a plurality of receivers relative to a shared origin, a putative position vector for the shared origin and phase information of waves measured at each of the plurality of receivers, to determine a position vector between the shared origin and a source of the waves; and positioning an apparatus using the determined position vector.

The positioned apparatus may, for example, have a defined spatial relationship to the shared origin. Alternatively, the positioned apparatus may, for example, have a defined spatial relationship to the wave source.

The wave source may be a radio wave source.

The wave source may bean acoustic wave source. The acoustic waves may be human audible or human inaudible.

The acoustic waves may occupy a sub-band at frequencies below that normally audible to humans e.g. sonar. The acoustic waves may occupy a supra-band at frequencies above that normally audible to humans e.g. ultrasound.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A positioning method for positioning an electronic apparatus comprising:
    solving a geometric algebraic expression that relates:
        1) position vectors for a plurality of signals received from either a) a plurality of antennas or b) a plurality of receivers relative to a shared origin,
        2) a putative position vector for the shared origin and
        3) phase information measured at each of the plurality of a) the antennas or b) the receivers,
    to determine a position vector for the shared origin; and
    positioning the electronic apparatus using the determined position vector for the shared origin,
    wherein solving the geometric algebraic expression comprises determining a putative position vector for the shared origin that is parallel to a difference vector defined as the difference between an averaged origin dependent vector and an averaged phase dependent vector wherein
    the averaged origin dependent vector is formed from a summation of geometric products, each of which involves two position vectors for a respective antenna and the putative position vector for the shared origin and
    wherein the averaged phase dependent vector is formed from a summation of geometric products involving two position vectors for a respective antenna or receiver, wherein one of the two position vectors is scaled using the phase information for the respective antenna or receiver.

2. A positioning method as claimed in claim 1, wherein the apparatus houses the plurality of antennas.

3. A positioning method as claimed in claim 1, wherein the apparatus houses at least one but not all of the plurality of antennas.

4. A positioning method as claimed in claim 1, wherein position vectors for a respective antenna or receiver are pre-determined and stored in memory.

5. A positioning method as claimed in claim 4, wherein position vectors are determined by an iterative process.

6. A positioning method as claimed in claim 5, wherein the phase information for an antenna or receiver is dependent upon a measured phase for that antenna or receiver compensated by an offset for that antenna or receiver.

7. A positioning method as claimed in claim 6, wherein the offsets for the antennas or receivers are pre-determined and stored in a memory.

8. A positioning method as claimed in claim 7, wherein the offsets are determined . . . each time position vectors change.

9. A positioning method as claimed in claim 1, wherein the averaged phase dependent vector is defined by:

$$\vec{\gamma} = \sum_{n=1}^{\Gamma} \sum_{k=1}^{P(n)} \left(\frac{1}{2}\beta_{n,k}\vec{r}_n\right)^2$$

where
n is the index identifying a respective one of the plurality of antennas or receivers
$\vec{r}_n$ is a vector positioning an antenna or receiver to a shared origin
k is the index identifying a phase measurement
$\beta_{n,k}$ is phase information relating to a phase measurement at instant k at antenna or receiver n and is expressed in the dimensions of distance
$\Gamma$ is the number of antennas or receivers
P(n) is the number of phase measurements made at the antenna or receiver n.

10. A positioning method as claimed in claim 9, wherein the averaged origin dependent vector is defined by:

$$\partial[\hat{\vec{R}}_{s,m}] = \sum_{n=1}^{\Gamma} \sum_{k=1}^{P(n)} \left(\frac{1}{4}\vec{r}_n\hat{\vec{R}}_{s,m}\vec{r}_n\right)$$

where
n is the index identifying a respective one of the plurality of antennas or receivers
$\vec{r}_n$ is a vector positioning an antenna or receiver n with respect to a shared origin
k is the index identifying a phase measurement
$\Gamma$ is the number of antennas or receivers
P(n) is the number of phase measurements made at the antenna or receiver n
$\hat{\vec{R}}_{s,m}$ is a putative unit vector between source and the shared origin from which $\vec{r}_n$ are measured, where s is an index identifying the source of the received signals.

11. A positioning method as claimed in claim 10 wherein the geometric algebraic expression may be expressed as $$(\partial[\hat{\vec{R}}_{s,m}] - \vec{\gamma}) \cdot \hat{\vec{R}}_{s,m} = 0.$$

12. A positioning method as claimed in claim 10, wherein solving the geometric algebraic expression involves solving by iteration:

$$\partial[\hat{\vec{R}}_{s,m}]\hat{\vec{R}}_{s,m} - \hat{\vec{R}}_{s,m}\partial[\hat{\vec{R}}_{s,m}] - \vec{\gamma}\partial[\hat{\vec{R}}_{s,m}] = \hat{\vec{R}}_{s,m}\vec{\gamma} = 0$$

where $$\partial[\hat{\vec{R}}_{s,m}] = \sum_{n=1}^{\Gamma} \sum_{k=1}^{P(n)} \left(\frac{1}{4}\vec{r}_n\hat{\vec{R}}_{s,m}\vec{r}_n\right)$$

-continued $$\vec{\gamma} = \sum_{n=1}^{\Gamma} \sum_{k=1}^{P(n)} \left(\frac{1}{2}\beta_{n,k}\vec{r}_n\right)^2$$

where n is the index identifying a respective one of the plurality of antennas or receivers, $\vec{r}_n$ is a vector positioning an antenna n with respect to a shared origin k is the index identifying a phase measurement, $\beta_{n,k}$ is phase information relating to a phase measurement at instant k at antenna n and is expressed in the dimensions of distance, $\Gamma$ is the number of antennas or receivers, P(n) is the number of phase measurements made at the antenna or receiver n, and $\hat{R}_{s,m}$ is a putative unit vector between source and the shared origin from which $\hat{R}_n$ are measured, where s is an index identifying the source of the received signals.

13. A positioning method as claimed in claim 10, wherein solving the geometric algebraic expression involves solving by iteration any one or more of the following iterative geometric algebraic expressions:

$$\hat{R}_{s,m+1} = \partial[\hat{R}_{s,m}]^{-1}(\hat{R}_{s,m}\partial[\hat{R}_{s,m}] + \vec{\gamma}\partial[\hat{R}_{s,m}] - \hat{R}_{s,m}\vec{\gamma})$$

$$\hat{R}_{s,m+1} = (\partial[\hat{R}_{s,m}]\hat{R}_{s,m} - \vec{\gamma}\partial[\hat{R}_{s,m}] + \hat{R}_{s,m}\vec{\gamma})\partial[\hat{R}_{s,m}]^{-1}$$

$$\hat{R}_{s,m+1} = (-\partial[\hat{R}_{s,m}]\hat{R}_{s,m} + \hat{R}_{s,m}\partial[\hat{R}_{s,m}] + \vec{\gamma}\partial[\hat{R}_{s,m}])\vec{\gamma}^{-1}$$

$$\hat{R}_{s,m+1} = \vec{\gamma}^{-1}(\partial[\hat{R}_{s,m}]\hat{R}_{s,m} - \hat{R}_{s,m}\partial[\hat{R}_{s,m}] + \hat{R}_{s,m}\vec{\gamma})$$

where $$\partial[\hat{R}_{s,m}] = \sum_{n=1}^{\Gamma} \sum_{k=1}^{P(n)} \left(\frac{1}{4}\vec{r}_n\hat{R}_{s,m}\vec{r}_n\right)$$

$$\vec{\gamma} = \sum_{n=1}^{\Gamma} \sum_{k=1}^{P(n)} \left(\frac{1}{2}\beta_{n,k}\vec{r}_n\right)^2$$

n is the index identifying a respective one of the plurality of antennas or receivers, $\vec{r}_n$ is a vector positioning an antenna or receiver n with respect to a shared origin k is the index identifying a phase measurement, $\beta_{n,k}$ is phase information relating to a phase measurement at instant k at antenna n and is expressed in the dimensions of distance, $\Gamma$ is the number of antennas or receivers, P(n) is the number of phase measurements made at the antenna or receivers n, and $\hat{R}_{s,m}$ is a putative unit vector between source and the shared origin from which $\vec{r}_n$ are measured, where s is an index identifying the source of the received signals.

14. An apparatus comprising:
processing circuitry configured to solve a geometric algebraic expression that relates: position vectors for a plurality of antennas or receivers relative to a shared origin, a putative position vector for the shared origin and phase information for each of the plurality of antennas or receivers, to determine a position vector for the shared origin and configured to perform positioning of the apparatus using the determined position vector for the shared origin; and an interface configured to provide phase measurements, wherein the processing circuitry configured to solve the geometric algebraic expression comprises the processing circuitry configured to determine a putative position vector for the shared origin that is parallel to a difference vector defined as the difference between an averaged origin dependent vector and an averaged phase dependent vector wherein the averaged origin dependent vector is formed from a summation of geometric products, each of which involves two position vectors for a respective antenna and the putative position vector for the shared origin and wherein the averaged phase dependent vector is formed from a summation of geometric products involving two position vectors for a respective antenna or receiver wherein one of the two position vectors is scaled using the phase information for the respective antenna or receiver.

15. An apparatus as claimed in claim 14, wherein the interface is configured to provide, from storage, a set of position vectors for the plurality of antennas or receivers.

16. An apparatus as claimed in claim 14, wherein the interface is configured to provide, from storage, an initial putative position vector of the shared origin and the processing circuitry is configured to solve the geometric algebraic expression by iteration starting with the initial putative position vector.

17. An apparatus as claimed in claim 14, wherein the interface is configured to provide, from storage, a set of predetermined antenna dependent phase offsets, wherein the phase information for each of the plurality of antennas or receivers is dependent upon a measured phase for a respective antenna or receiver compensated by a phase offset for the respective antenna or receiver.

18. A computer program product comprising a non-transitory computer readable medium having a computer program stored thereon, which when executed by a processor causes an apparatus to perform the method of claim 1.

19. The computer program product of claim 18, wherein the apparatus is configured to receive a plurality of signals from dispersed reception points, and perform the method of claim 1 utilizing the plurality of received signals.

* * * * *